Patented Sept. 18, 1951

2,568,570

UNITED STATES PATENT OFFICE 2,568,570

PREPARATION OF METAL PHTHALOCYANINES

Frederick W. Sullivan, Jr., Madison, N. J., assignor to The Standard Ultramarine Company, Huntington, W. Va., a corporation of West Virginia No Drawing. Application May 24, 1949, Serial No. 95,165

15 Claims. (Cl. 260—314.5)

This invention relates to the preparation of porphyrazine derivatives. More particularly, this invention relates to the preparation of tetra-condensed porphyrazines and derivatives thereof.

The preparation and properties of porphyrazine derivatives, especially tetra-condensed porphyrazines and their derivatives, is well known to those skilled in the art. For example, tetrabenzo porphyrazine (tetrabenzo tetraazaporphin, phthalocyanine) is a greenish-blue pigment, insoluble in most solvents and exhibiting outstanding stability to such diverse influences as heat, acids, alkalies, oxidizing agents and reducing agents. The copper derivative of phthalocyanine (copper phthalocyanine, phthalocyanine blue) is a brilliant blue pigment showing all the excellent properties of the metal-free parent compound, in some instances (e. g. stability towards acids), to an enhanced degree. If fourteen to sixteen of the sixteen hydrogen atoms on the four benzo groups of copper phthalocyanine are replaced with chlorine, a green pigment results (chlorinated copper phthalocyanine, phthalocyanine green) exhibiting all of the outstanding properties of copper phthalocyanine itself.

Copper phthalocyanine may be prepared by a variety of methods. In fact, because of the surprisingly great stability of the sixteen-membered porphyrazine ring, a great number of materials can be converted to this configuration under a wide range of reaction conditions. However, only three preparative methods have been used commercially:

A. Phthalonitrile, when heated with finely divided copper powder gives copper phthalocyanine. This preparative method has many disadvantages. Phthalonitrile is rather difficult to prepare and accordingly is quite expensive. Additionally, this intermediate is unstable, polymerizing rather rapidly at the copper phthalocyanine forming temperature. Furthermore, this dinitrile sublimes at the reaction temperature which causes operating difficulties. Most important, the phthalonitrile-copper reaction is strongly exothermic and heat dissipation is difficult since the reaction mixture is an extremely thick mass with poor heat transfer characteristics.

B. Phthalonitrile, when heated with cuprous chloride, produces copper phthalocyanine, provided a rather large excess of the copper salt is used. If the theoretical amount or only a small excess of copper salt is employed, the reaction product is a mixture of copper phthalocyanine and monochloro copper phthalocyanine, this mixture being slightly greener in shade than pure copper phthalocyanine. Obviously, this method suffers from all the disadvantages discussed in connection with method A.

C. Phthalic anhydride, urea and cupric chloride are fused together, usually in the presence of a catalyst, to form copper phthalocyanine. It is probable that biuret or a similar thermal decomposition product of urea is the actual nitrogen supplying reagent in this reaction since copper phthalocyanine is also obtained if the urea is replaced with the crude reaction mixture obtained by heating urea (containing biuret, cyanuric acid, ammelide and the like) or with pure biuret isolated from this crude reaction mixture. Obviously, this preparative method obviates most of the difficulties discussed in connection with the methods described previously. Phthalic anhydride, while moderately expensive, is much less expensive than phthalonitrile which is not unexpected in view of the fact that the dicyanide is usually prepared from the anhydride. Phthalic anhydride is a very stable compound but does give trouble due to sublimation. The reaction is approximately neutral thermally. While the conversion of phthalonitrile to copper phthalocyanine is strongly exothermic, the conversion of phthalic anhydride to phthalonitrile is strongly endothermic so that on going directly from phthalic anhydride to copper phthalocyanine an approximately thermally neutral reaction results.

The crude phthalocyanine blue reaction mass, prepared as above described or otherwise, does not exhibit any great tinctorial power until it has been conditioned. One suitable conditioning procedure involves solution of the crude pigment mass in about ten parts sulfuric acid followed by pouring onto sufficient crushed ice to give a final slurry containing in the neighborhood of 15% acid. The pigment is separated from the slurry and the resulting pigment paste is washed and may then be laked as usual. Or, if desired, the pigment may be flushed or may be dried, preferably subsequent to adsorption of suitable dispersing aids or grinding aids on the surface of the pigment particles. The resulting dried pigment can be readily dispersed in aqueous media or is readily wetted by and ground into non-aqueous media, such as siccative oils, depending upon the nature of the surface treatment prior to drying.

I have discovered that certain metal phthalocyanines, for example, copper phthalocyanine, may be prepared by an improved method that eliminates the previously mentioned operating difficulties inherent in the preparative methods employed in the art and that is also more economic than these prior art procedures. Briefly, my improved method involves the interaction of certain salts of phthalic acid with urea, preferably in the presence of a suitable catalyst.

The principal object of my invention is to provide an improved method for the preparation of certain metal phthalocyanines that is more economical and more convenient than those hitherto employed in the art.

Another object of my invention is to provide an improved method for the preparation of copper phthalocyanine that is more economical and more convenient than those hitherto employed in the art.

Other objects of my invention will become manifest as the description thereof proceeds.

Because of the many economic and operating difficulties involved in the preparation of copper phthalocyanine from phthalonitrile, some of the more important of which have already been set forth, these methods have been almost completely replaced by the procedure involving the interaction of phthalic anhydride, urea and cupric chloride. While this phthalic anhydride synthesis represents a marked advance, both from the operating and economic standpoint, over the synthesis employing phthalonitrile, yet the phthalic anhydride procedure is not perfect.

Phthalic anhydride sublimes with great ease and this results in serious operating difficulties in the process employing this compound as a starting material. The sublimed phthalic anhydride condenses in the cooler portions of the apparatus and thus frequently blocks lines, freezes packing glands and bearings, etcetera. Furthermore, the vapors of phthalic anhydride are extremely irritating and working conditions in the presence of such vapors are very bad and labor turnover is high. Also, the sublimation of phthalic anhydride represents a distinct economic loss since an excess of this material must be employed to compensate for the portion that will sublime during reaction. Finally, complete recovery of sublimed material is impossible and even partial recovery is expensive and unpleasant and the recovered material is obtained in a physical form that is inconvenient for use in a subsequent batch.

Additionally, while the greater part of all phthalic anhydride made is produced directly as the anhydride, in one process which is employed to a considerable extent, the product is initially recovered as phthalic acid which must be converted to the anhydride prior to use in the manufacture of phthalocyanines by method C.

Through my improved process, in which certain salts of phthalic acid are employed instead of phthalic anhydride, the above difficulties are eliminated. Salts of phthalic acid do not sublime and accordingly the above mentioned operating and labor difficulties are eliminated. Furthermore, in those manufacturing procedures wherein phthalic acid is recovered as such, this acid may be used directly in my process without going to the trouble and expense of converting the acid to the anhydride. Additionally, a source of phthalic acid that has hitherto been wasted, may be employed in my process. In the manufacture of phthalic anhydride, the crude product is usually vacuum distilled to produce market grade material. In the distillation operation, still bottoms, representing from 5 to 15% of the still charge, are eliminated. This phthalic anhydride pitch contains considerable phthalic anhydride but recovery of this material has hitherto not been economic. However, if this pitch is finely ground and treated with boiling water and then filtered, the filtrate is a solution of phthalic acid which may be employed in the process of my invention as will become evident as the description thereof proceeds.

For the better understanding of my invention, the following illustrative but non-limiting examples thereof are given:

*Example 1.*—Twenty parts by weight phthalic anhydride are dissolved in 300 parts by weight hot water while 30 parts by weight hydrated cupric acetate are dissolved in 200 parts by weight hot water. The two solutions are mixed together at the boiling point and then evaporated. The resulting solid is washed with acetone followed by two washings with water. Thirty parts by weight dry solid is obtained, representing an almost theoretical yield of copper phthalate.

The above copper phthalate, together with 100 parts by weight of urea and one part by weight ammonium molybdate (catalyst) are baked to dryness on a hot plate. The resulting solid is digested with hydrochloric acid and then with potassium hydroxide solution and is finally dissolved in concentrated sulfuric acid, filtered and diluted with ice and water to precipitate the desired pigment which is separated by filtration, washed and dried. The dry pigment amounts to 14.2 parts by weight, representing a yield of 75% of theoretical based on copper phthalate or 73% based on phthalic anhydride.

*Example 2.*—The manipulations of Example 1 were repeated with the exception that the crude copper phthalate was not washed with acetone and water. Similar results were obtained with the exception that the color yield was somewhat lower.

*Example 3.*—Similar to Example 1, except that copper carbonate was used in place of hydrated cupric acetate. For some unknown reason this resulted in an appreciably lower color yield but the results were otherwise similar.

*Example 4.*—Similar to Example 1 except that copper ammonium phthalate was used in place of copper phthalate. Similar results were obtained.

*Example 5.*—Similar to Example 1, except that cobalt acetate was used in place of hydrated cupric acetate. The color yield was 42%, based on phthalic anhydride.

*Example 6.*—Similar to Example 1, except that zinc acetate was substituted for hydrated cupric acetate. The color yield was only 21% based on phthalic anhydride, this product being appreciably soluble in dilute sulfuric acid.

While, as the preceding examples show, a number of salts of phthalic acid will react with urea to produce metal phthalocyanines, there is considerable variation in their effectiveness and, in addition, experiments have shown that some salts, even some heavy metal salts, do not react with urea to form a color. For example, lead phthalate and urea, heated together in the presence of catalytic amounts of ammonium molybdate, give no color. The nickel salt, however, gives excellent results.

While ammonium molybdate has been employed as catalyst in the preceding examples, any prior art material for accelerating the formation of the sixteen membered porphyrazine ring may be used. Among such other catalysts, boric acid is particularly effective.

Obviously, any desired derivatives of the metal phthalocyanines may be produced in accordance with this invention. These include derivatives in which one or more hydrogens on the four benzo groups are replaced by such groups as halogens, chloromethyl groups, amino, alkylamino, arylamino or alkarylamino groups, acetoamino groups, azo groups, alkoxy and aryloxy groups, nitro groups, sulfonic acid groups, carboxyl groups, alkoyl and aroyl groups, phenyl groups and the like. These may be prepared by either starting with the appropriately substituted phthalic acid or by modifying, by known means, the metal phthalocyanines produced.

The benzo groups of the metal phthalocyanines may be replaced by other equivalent groups by using appropriate ortho dicarboxylic acids as starting materials. Thus by employing 1,2 or 2,3 dicarboxy naphthalenes, 2,3 dicarboxy thionaphthalenes, 2,3 dicarboxy thiophene and the like, tetra-condensed tetraporphyrazine analogs of the metal phthalocyanines result.

The metal in the pigments prepared in accordance with this invention may be removed to give phthalocyanine itself or may be replaced by other metals, such as the alkali metals, the alkaline earth metals, iron, magnesium, lead and the like by methods well known in the art.

Be it remembered, that while the present invention has been described in connection with certain specific details and certain specific examples thereof, it is to be understood that these are illustrative only and do not limit the spirit or scope of said invention except as these may be incorporated in the appended claims.

I claim:

1. A process for producing metal phthalocyanines consisting of heating at reaction temperature a mixture of urea and a salt of phthalic acid, the metal of said salt having an atomic number in the range 27 to 30.

2. A process for producing metal phthalocyanines consisting of heating at reaction temperature in the presence of a catalyst a mixture of urea and a salt of phthalic acid, the metal of said salt having an atomic number in the range 27 to 30.

3. A process for producing metal phthalocyanines consisting of heating at reaction temperature in the presence of catalytic amounts of molybdenum oxide a mixture of urea and a salt of phthalic acid, the metal of said salt having an atomic number in the range 27 to 30.

4. A process for producing metal phthalocyanines consisting of heating at reaction temperature a mixture of urea and copper phthalate.

5. A process of producing metal phthalocyanines consisting of heating at reaction temperature in the presence of a catalyst a mixture of urea and copper phthalate.

6. A process for producing metal phthalocyanines consisting of heating at reaction temperature in the presence of catalytic amounts of molybdenum oxide a mixture of urea and copper phthalate.

7. A process for producing metal phthalocyanines consisting of heating at reaction temperature a mixture of urea and cobalt phthalate.

8. A process for producing metal phthalocyanines consisting of heating at reaction temperature in the presence of a catalyst a mixture of urea and cobalt phthalate.

9. A process for producing metal phthalocyanines consisting of heating at reaction temperature in the presence of catalytic amounts of molybdenum oxide a mixture of urea and cobalt phthalate.

10. A process for producing metal phthalocyanines consisting of heating at reaction temperature a mixture of urea and nickel phthalate.

11. A process for producing metal phthalocyanines consisting of heating at reaction temperature in the presence of a catalyst a mixture of urea and nickel phthalate.

12. A process for producing metal phthalocyanines consisting of heating at reaction temperature in the presence of catalytic amounts of molybdenum oxide a mixture of urea and nickel phthalate.

13. A process for producing metal phthalocyanines consisting of heating at reaction temperature a mixture of urea and zinc phthalate.

14. A process for producing metal phthalocyanines consisting of heating at reaction temperature in the presence of a catalyst a mixture of urea and zinc phthalate.

15. A process for producing metal phthalocyanines consisting of heating at reaction temperature in the presence of catalytic amounts of molybdenum oxide a mixture of urea and zinc phthalate.

FREDERICK W. SULLIVAN, Jr.

REFERENCES CITED

The following references are of record in the file of this patent:

UNITED STATES PATENTS

| Number | Name | Date |
| --- | --- | --- |
| 2,214,477 | Riley | Sept. 10, 1940 |
| 2,216,761 | Wyler | Oct. 8, 1940 |
| 2,469,663 | Moser | May 10, 1949 |